(12) United States Patent
Askerdal et al.

(10) Patent No.: US 9,238,550 B2
(45) Date of Patent: Jan. 19, 2016

(54) CONVEYOR BEAM

(71) Applicant: FlexLink AB, Göteborg (SE)

(72) Inventors: Magnus Askerdal, Hajom (SE); Marko Salmi, Lindome (SE)

(73) Assignee: FlexLink AB (SE)

( * ) Notice: Subject to any disclaimer, the term of this patent is extended or adjusted under 35 U.S.C. 154(b) by 0 days.

(21) Appl. No.: 14/412,401

(22) PCT Filed: Jul. 3, 2013

(86) PCT No.: PCT/SE2013/050858
§ 371 (c)(1),
(2) Date: Dec. 31, 2014

(87) PCT Pub. No.: WO2014/007747
PCT Pub. Date: Jan. 9, 2014

(65) Prior Publication Data
US 2015/0136571 A1    May 21, 2015

(30) Foreign Application Priority Data
Jul. 4, 2012   (SE) ....................... 1250762

(51) Int. Cl.
*B65G 21/06*    (2006.01)
*F16B 2/14*    (2006.01)
(Continued)

(52) U.S. Cl.
CPC . *B65G 21/06* (2013.01); *F16B 2/14* (2013.01); *E04C 2003/0417* (2013.01); *E04C 2003/0434* (2013.01); *E04C 2003/0465* (2013.01); *F16B 21/02* (2013.01)

(58) Field of Classification Search
CPC .......... B65G 21/06; B65G 21/02; F16B 2/18; F16B 7/04; F16B 2/14; E04B 1/58
USPC ........................................... 198/860.1, 860.2
See application file for complete search history.

(56) References Cited

U.S. PATENT DOCUMENTS 4,930,623 A * 6/1990 Johnson ............... B65G 17/002
198/860.1
4,961,492 A * 10/1990 Wiseman ............. B65G 17/086
198/841

(Continued)

FOREIGN PATENT DOCUMENTS

DE    7119423    1/1973
DE    3537135    4/1987

(Continued)

OTHER PUBLICATIONS

"International Application No. PCT/SE2013/050858, International Preliminary Report on Patentability mailed Oct. 14, 2014", 11 pgs.

(Continued)

*Primary Examiner* — James R Bidwell
(74) *Attorney, Agent, or Firm* — Schwegman Lundberg & Woessner, P.A.

(57) ABSTRACT

Conveyor beam for a conveyor system, comprising a plurality of connector elements and at least two conveyor beam elements, where the connector element comprises a central portion, two outer portions and two peripherally grooves extending peripherally around the connector element between the central portion and the outer portions, where the connector element is provided with a first inserting position in which the connector element is inserted between two conveyor beam elements with the first outer portion positioned in a channel of a first conveyor beam element and the second outer portion positioned in a channel of a second conveyor beam elements, and a second arresting position, in which the connector element locks the conveyor beam elements together to form the conveyor beam. The advantage of the invention is that a conveyor beam of any desired shape can be obtained in an easy and fast way.

13 Claims, 5 Drawing Sheets

(51) Int. Cl.
*F16B 21/02* (2006.01)
*E04C 3/04* (2006.01)

(56) References Cited

U.S. PATENT DOCUMENTS

| | | | | |
|---|---|---|---|---|
| 4,967,897 | A | * 11/1990 | Lachonius | B65G 21/22 198/860.1 |
| 5,131,531 | A | * 7/1992 | Chambers | B65G 21/06 198/860.2 |
| 5,316,134 | A | * 5/1994 | Donohue | B65G 21/06 198/860.2 |
| 6,612,426 | B1 | * 9/2003 | Guerra | B65G 21/06 198/860.2 |
| 6,820,737 | B2 | 11/2004 | Koeda et al. | |
| 6,854,397 | B2 | 2/2005 | Terajima et al. | |

FOREIGN PATENT DOCUMENTS

| | | |
|---|---|---|
| DE | 10146492 | 4/2003 |
| EP | 0315775 | 5/1989 |
| FR | 2074382 | 10/1971 |
| FR | 2333993 | 7/1977 |
| GB | 2397610 | 7/2004 |
| WO | WO-2010/001689 | 1/2010 |
| WO | WO-2014/007747 | 1/2014 |

OTHER PUBLICATIONS

"International Application No. PCT/SE2013/050858, International Search Report mailed Oct. 17, 2013", 5 pgs.

* cited by examiner

CONVEYOR BEAM

PRIORITY CLAIM TO RELATED APPLICATIONS

This application is a U.S. national stage application filed under 35 U.S.C. §371 from International Application Serial No. PCT/SE2013/050858, which was filed Jul. 3, 2013, and published as WO 2014/007747 on Jan. 9, 2014, and which claims priority to Sweden Application No. 1250762-0, filed Jul. 4, 2012, which applications and publication are incorporated by reference as if reproduced herein and made a part hereof in their entirety, and the benefit of priority of each of which is claimed herein.

TECHNICAL FIELD

The present invention relates to a conveyor beam comprising a plurality of unitary connector elements interconnecting two beam elements into a conveyor beam. Such a conveyor beam may comprise beam elements of different kinds, such as a split straight conveyor beam element, a plain bend element, an X-bend element or other conveyor beam elements.

BACKGROUND ART

Conveying devices, such as those which are used for moving objects between different stations in a factory, usually comprise a conveying track comprising a belt or a chain. A conveyor track consists of an endless conveyor chain that is supported by a conveyor beam. The conveyor chain glides on a sliding surface on the conveyor beams in order to reduce the friction and the wear, usually a slide rail. The conveyor track comprises straight beams, curves, bends and other conveyor components such as drive units or idler end units. Conveyor beams are usually made from extruded aluminium profiles. Straight conveyor beams are, when possible, extruded in one piece. Larger or wider conveyor beams may comprises several conveyor beam segments that are interconnected to each other in order to obtain the wanted size or width. It is also possible to assemble a conveyor beam from beam segments for providing conveyor beam types that are produced in smaller numbers, where a complete tool is not cost efficient. One such example is when additional slide rails are to be mounted in the conveyor beam profile.

The conveyor beam parts that are not straight, such as horizontal and vertical bends, are difficult to manufacture from a single profile and are mostly assembled from pre-bent beam segments with a connecting beam clip assembly. A beam clip assembly comprises two clip parts that are mounted to each other with a screw and a locking nut and that clamps the two beam segments together. The clip parts are adapted to the beam profile.

An example of a known conveyor beam interconnected with a beam segment connector is found in U.S. Pat. No. 6,854,397 B2 and U.S. Pat. No. 6,820,737 B2, where two clamp bodies are used to connect two conveyor portions by using a bolt and a nut. Engaging members on each side of the clamp bodies clamp wedge-shaped regions of the conveyor beam segments such that a conveyor beam is obtained.

A further example of a conveyor beam interconnected with a beam segment connector is found in WO 2010/001689 A1, where a connector element is used to assemble a conveyor beam from upper and lower frame segments. The connector element comprises a base body and screws that press a lock plate against sloped surfaces on the base body such that the frame members are squeezed and clamped between the base body and the lock plates.

These and other known conveyor beams are interconnected with different connector elements consisting of several parts which leads to a relatively complicated and time consuming assembly of the conveyor beam. There is thus room for an improved conveyor beam.

DISCLOSURE OF INVENTION

An object of the invention is therefore to provide an improved conveyor beam where a plurality of unitary connector elements interconnects two conveyor beam elements.

The solution to the problem according to the invention is described in the characterizing part of claim 1. The other claims contain advantageous embodiments and further developments of the conveyor beam.

In a conveyor beam for a conveyor system, comprising a plurality of unitary connector elements and at least two conveyor beam elements, object of the invention is achieved in that a connector element comprises a central portion, two outer portions and two peripherally grooves extending peripherally around the connector element between the central portion and the outer portions, where the connector element is provided with a first inserting position in which the connector element is inserted between two conveyor beam elements with the first outer portion positioned in a channel of a first conveyor beam element and the second outer portion positioned in a channel of a second conveyor beam elements, and a second arresting position, in which the connector element locks the conveyor beam elements together to form the conveyor beam.

By this first embodiment of the conveyor beam according to the invention, a conveyor beam comprising at least two conveyor beam elements, e.g. two split conveyor beams, can be assembled in a easy and reliable way. Since each connector element consists of one unitary part, preferably produced in one piece, the assembly of a conveyor beam by the use of the connector elements easy and cost-effective. The connector elements are simply inserted into longitudinal channels in the two conveyor beam elements that are to be interconnected and slid to the positions at which the interconnections should be located. At these positions, each connector element is rotated form the inserting position to the arresting position. The rotation of the connector element may be done by a wrench or a similar tool, or may be done by hand. During the rotation, the connector element will interact with the channels and will press against the inner sides of the channel with bearing surfaces of the connector element.

When a connector element is positioned and locked at the appropriate interconnection position, a new connector element can be inserted and positioned at a new interconnection position in the conveyor beam. In this way, a conveyor beam comprising two split conveyor beam elements is assembled in a fast and reliable way. This is advantageous in that both bends of different kinds and straight conveyor beams can be supplied in a cost-efficient way. The use of connector elements to assemble a conveyor beam is especially advantageous for conveyor bends. A conventional straight conveyor beam is produced by extruded aluminium. Such a beam is more or less impossible to bend, especially in a smaller radius. Instead, curved conveyor beams are assembled from two conveyor half beam elements. The use of a unitary connector element simplifies the assembly of a curved conveyor beam. It is also possible to assemble a wide conveyor beam from a central conveyor beam and two split conveyor beams by using a plurality of connector elements.

In an advantageous development of the invention, a conveyor beam is assembled by rotating the connector element by at least 45 degrees, and preferably by substantially 90 degrees from the inserting position to the arresting position. In this way, a conveyor beam that is securely locked by the connector elements is provided.

In an advantageous development of the invention, the bearing surfaces of the connector element is provided with protrusions that allow an even higher locking force between the connector element and the conveyor beam. The protrusions preferably provides for a self-locking action such that the connector element cannot rotate backwards without excessive force. In this way, vibrations induced in the conveyor track by the conveyor chain will not loosen the connector elements from the conveyor beam elements. Further, the protrusions preferably also provide an electrical contact between the conveyor beam elements and the connector element, such that all parts in the conveyor system can be grounded in a reliable way. The connector element is preferably provided with a key grip having four or six surfaces such that standard wrenches can be used when assembling the conveyor beam.

In an advantageous development of the invention, the conveyor beam comprises a third conveyor beam element attached to the conveyor beam by an attachment section of the connector element. The attachment section extends downwards from the central portion and secures the third conveyor beam element by a screw extending through a through-hole in the connector element. The third conveyor beam element is in one example a concealed conveyor chain return path, in which the return path of the conveyor chain is covered and thus protected from contamination from dust, liquids etc. The third conveyor beam element is preferably provided with inclined upper surfaces such that contaminating particles and the like do not stick to the upper surface.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
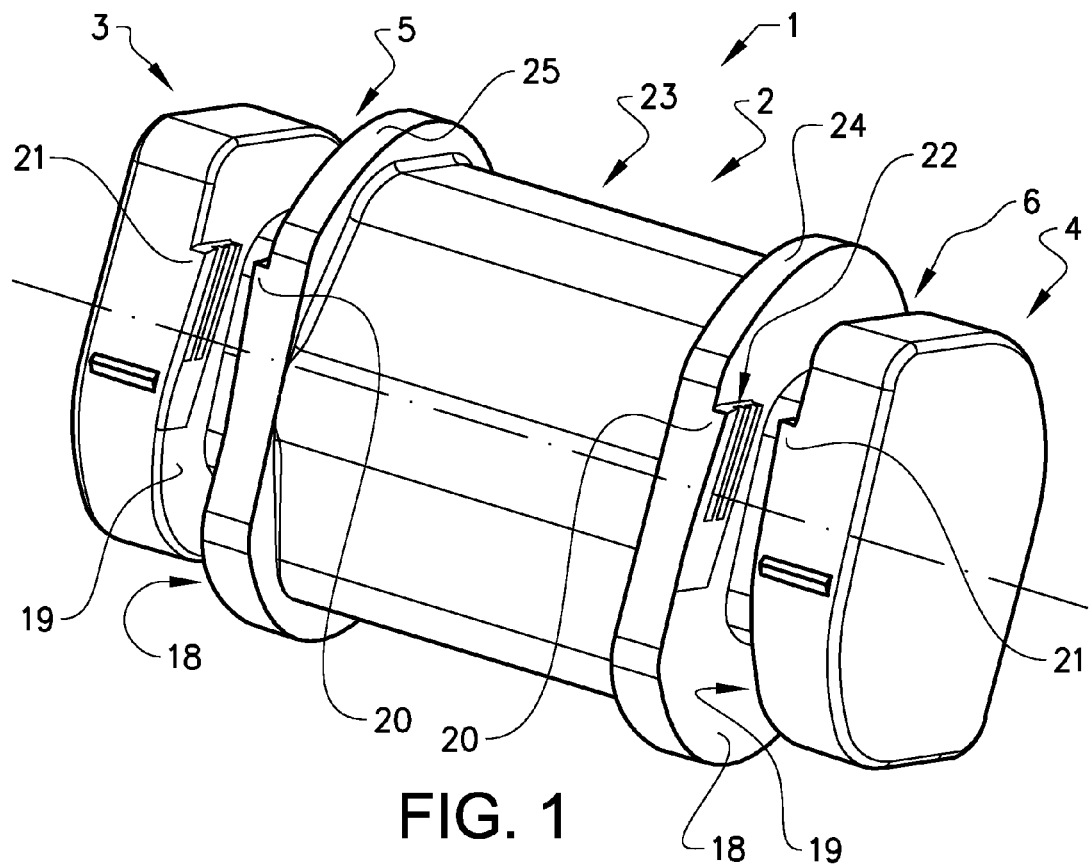
FIG. 1 shows a connector element for use in a conveyor beam according to the invention.
Figure 2:
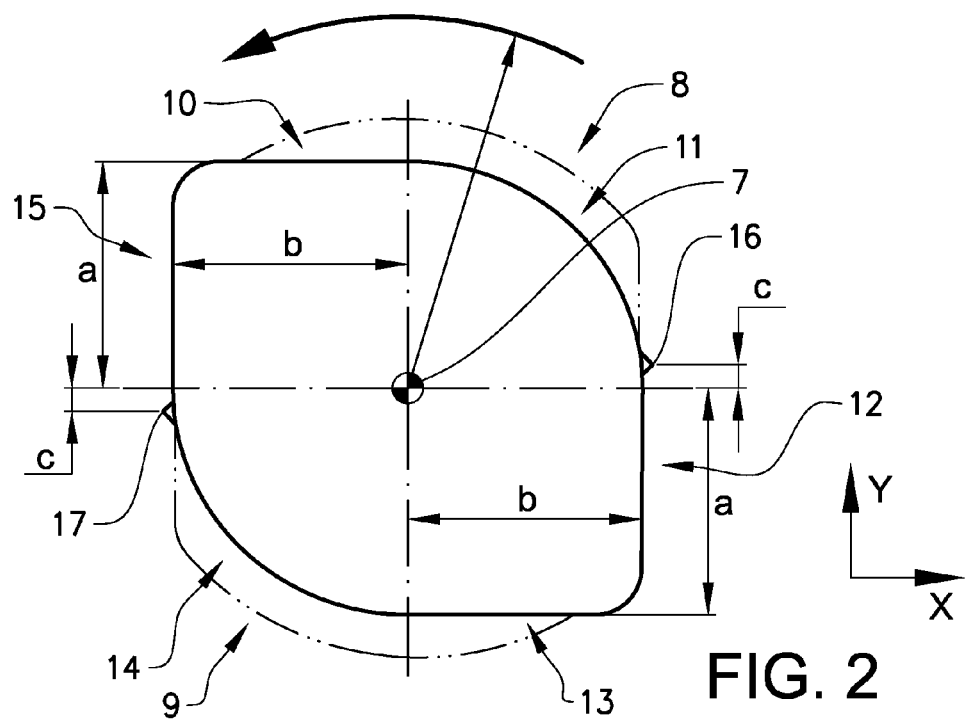
FIG. 2 shows a side view of an outer portion of the connector element.
Figure 5:
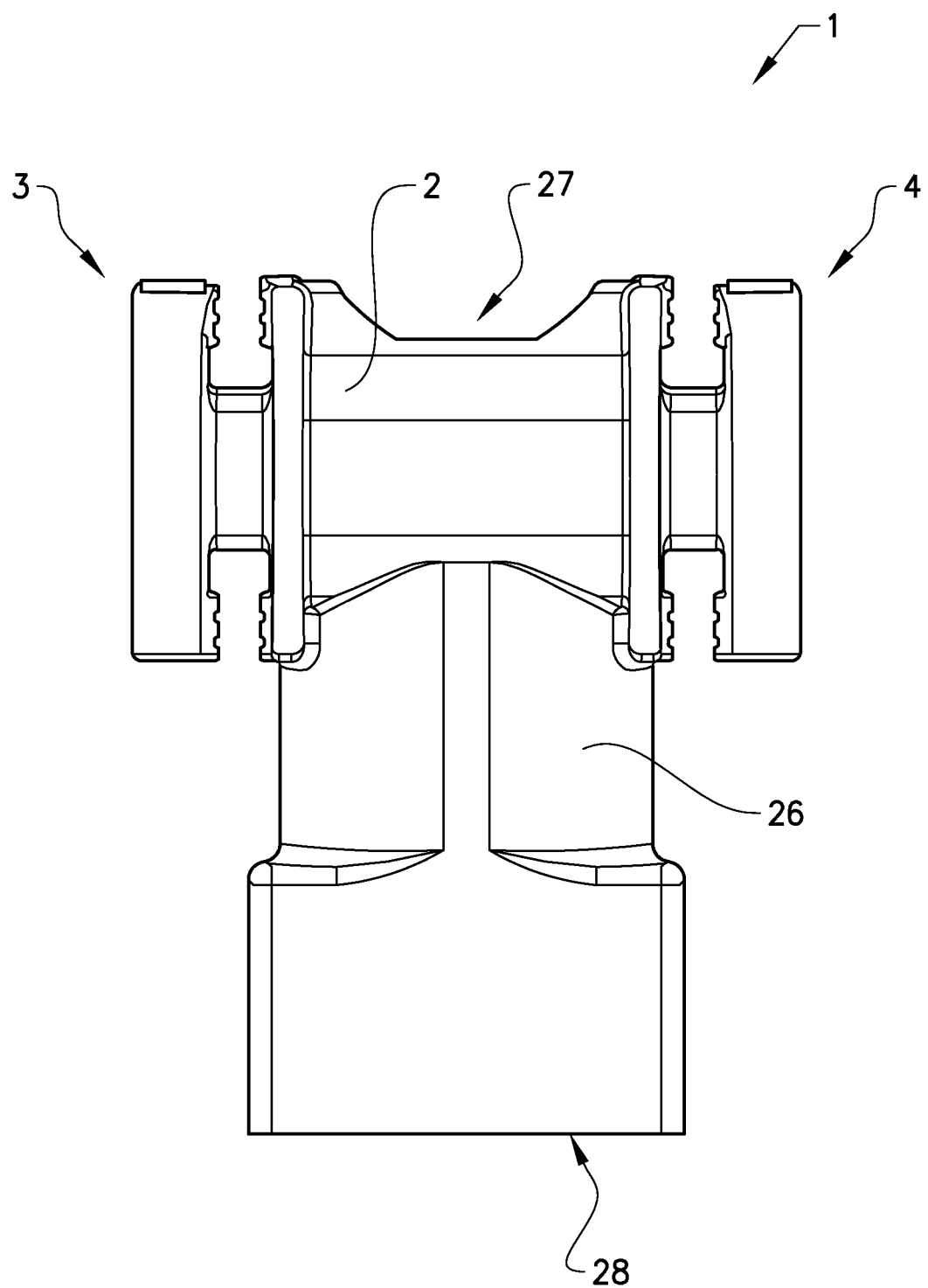
FIG. 5 shows a development of a connector element for use in a conveyor beam according to the invention.

FIG. 1 shows a connector element for use in a conveyor beam according to the invention in a perspective view, and FIG. 2 shows an outer portion of the connector element in a side view. In the described example, the connector element 1 comprises a central portion 2 and two outer portions 3, 4, one on each side of the central portion. The central portion 2 and the first and the second outer portions are provided with the same central axis 7. A first groove 5 which extends peripherally around the connector element is provided between the central portion 2 and the first outer portion 3, and a second groove 6 which extends peripherally around the connector element is provided between the central portion 2 and the second outer portion 4. The central portion is provided with flanges 24, 25 adjacent the grooves. The central portion is further provided with a key grip 23 such that a wrench or another suitable tool can grip the central portion. The central portion is thus provided with an even number of straight, parallel surfaces, such as e.g. four, six or eight surfaces. The central portion may also be provided with a specific outer surface shape, adapted for a specific mounting tool. Further, the connector may also be provided with a grip that allows a rotation of the connector element by hand. In this way, it is possible to provide a hand operated connector element, which may be of advantage especially for wider connector elements having a width corresponding to the width of a hand. For a hand operated connector element, the central portion is preferably unsymmetrical in order to facilitate the assembly. The connector element may also be provided with an attachment section adapted for holding a further conveyor beam element as shown in FIG. 5.

The outer portions 3, 4 are similar in shape and function. The second outer portion 4 will be described in greater detail, but the same applies to the first outer portion 3. The outer portion 4 is provided with two outer surfaces 8, 9 that are parallel to the centre axis 7 of the connector element 1. Each outer surface 8, 9 extends over 180 degrees of the periphery of the outer portion and comprise first straight surface parts 10, 13, a semi-circular surface part 11, 14 and second straight surface parts 12, 15. The distance a between the centre axis 7 and the first surface parts 10, 13 is smaller than the distance b between the centre axis 7 and the second surface parts 12, 15. In this way, it is possible to insert the connector element with the outer portions sliding in channels of conveyor beam elements and to rotate the connector element such that it is locked in the channels. The straight surface parts 10, 13 will slide against the channel surfaces and the straight surface parts 12, 15 will bear against the channel surfaces and will lock the connector element to the conveyor beam elements. The connector element is rotated by 90 degrees in counter-clockwise direction, as indicated with an arrow in FIG. 2.

In order to ensure that a conveyor beam is securely assembled, and that the connector element is securely locked in the conveyor beam elements, the second straight surface parts 12, 15 may be provided with one or more locking aids that will prevent the connector element to loosen by rotating clockwise, due e.g. to vibrations. In the shown example, a pointed protrusion 16, 17 is provided on each second straight surface part. The shape and size of the protrusion is preferably adapted to the size and material of the conveyor beam elements that are to be interconnected. In the shown example, the protrusion is symmetric with an acute angle. In this way, it is possible to disassemble the conveyor beam by removing the connector element with a tool if required. It is also possible to give the protrusions a wedge-shape such that it will be very difficult to disassemble the conveyor beam. The straight surface parts may also be provided with e.g. a serration or the like in order to increase the friction between the straight surface parts and the corresponding bearing surfaces. The protrusions 16, 17 are preferably positioned with an offset c from the centre of the connector element. This will help to prevent the connector element from coming loose.

Between the central portion 2 and the outer portions 3, 4, there is a groove 5, 6 on each side of the central portion. The grooves are adapted to cooperate with flanges of the conveyor beam element channels in which the outer portions will be inserted, and each groove will guide the connector element when inserting it into the conveyor beam element channels. The inner sides 18, 19 of each groove 5, 6 are further provided with a wedge shaped protrusion 20, 21, where the wedge shaped protrusions 20, 21 are adjacent the second surface parts 12, 15. The wedge-shape will help to position the connector element in the proper sideway position, and to give the assembled conveyor beam the proper width. This means that the width of the beam channel is not important for obtaining the proper width of a conveyor beam. Beam elements having beam channels with different widths can thus be used. A further advantage of fastening the connector element to flanges in the conveyor beam element is that the width of the outer portions 3, 4 can be smaller than the width of the conveyor beam element channels. In this way, the outer end surface of an outer portion must not bear on the vertical channel surface in order to obtain the proper width of the conveyor beam. This simplifies the insertion of a connector element to the desired mounting position in the channel.

The wedge shaped protrusions 20, 21 may further be provided with at least one second protrusion 22. This protrusion may help to increase the friction between the connector element and the conveyor elements, but is mainly intended to give an electrical connection between the connector element and the conveyor beam elements. The conveyor beam elements are normally produced from extruded aluminium which has a relatively hard layer of oxide. The protrusions are thus adapted to cut through the oxide layer in order to provide a metal to metal connection. The connector element is preferably produced from a metal material, such as steel or a steel alloy, and is preferably die casted.

Figure 3:
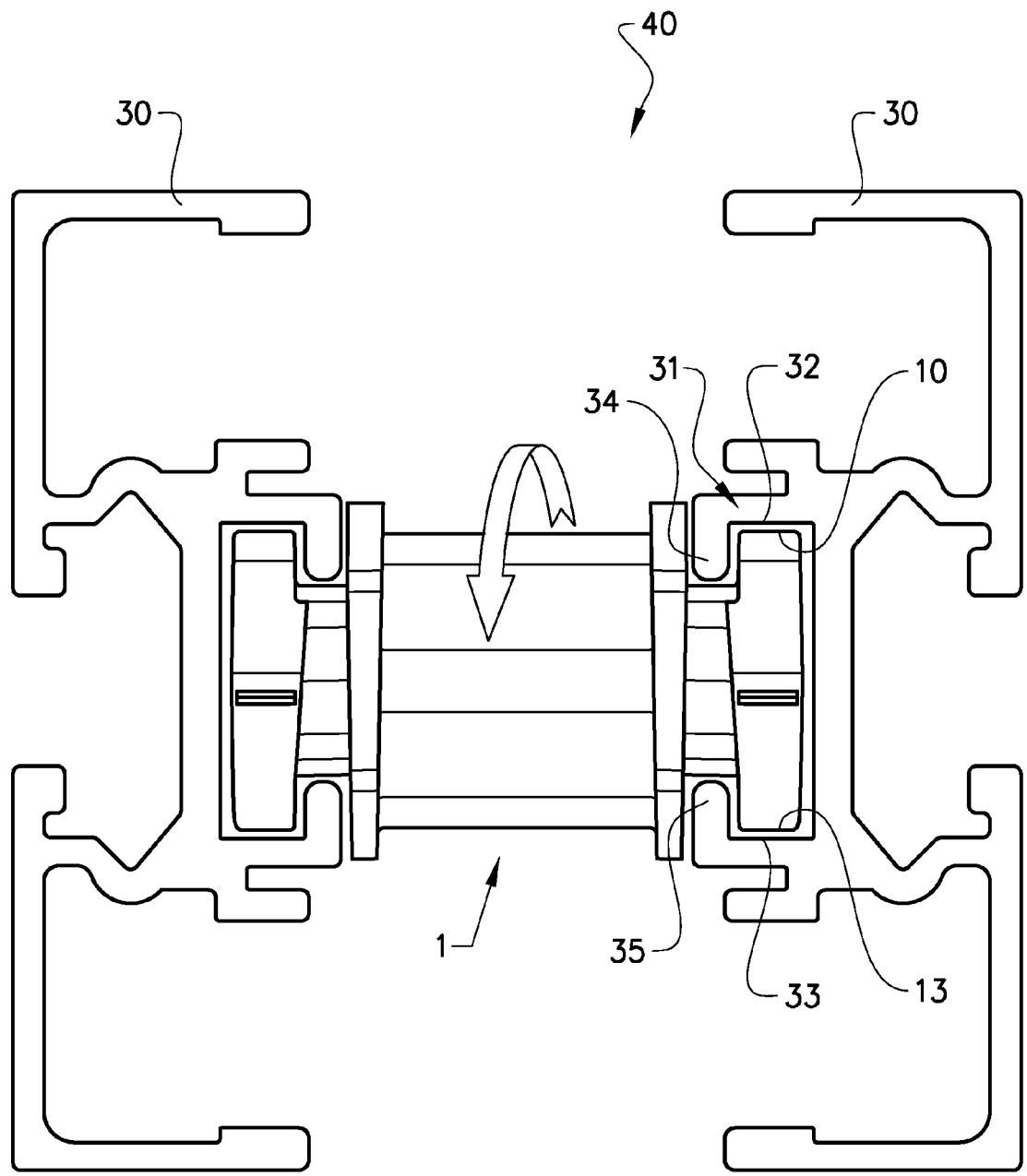
FIG. 3 shows a conveyor beam with a connector element in the inserting position at two conveyor beam elements.
Figure 4:
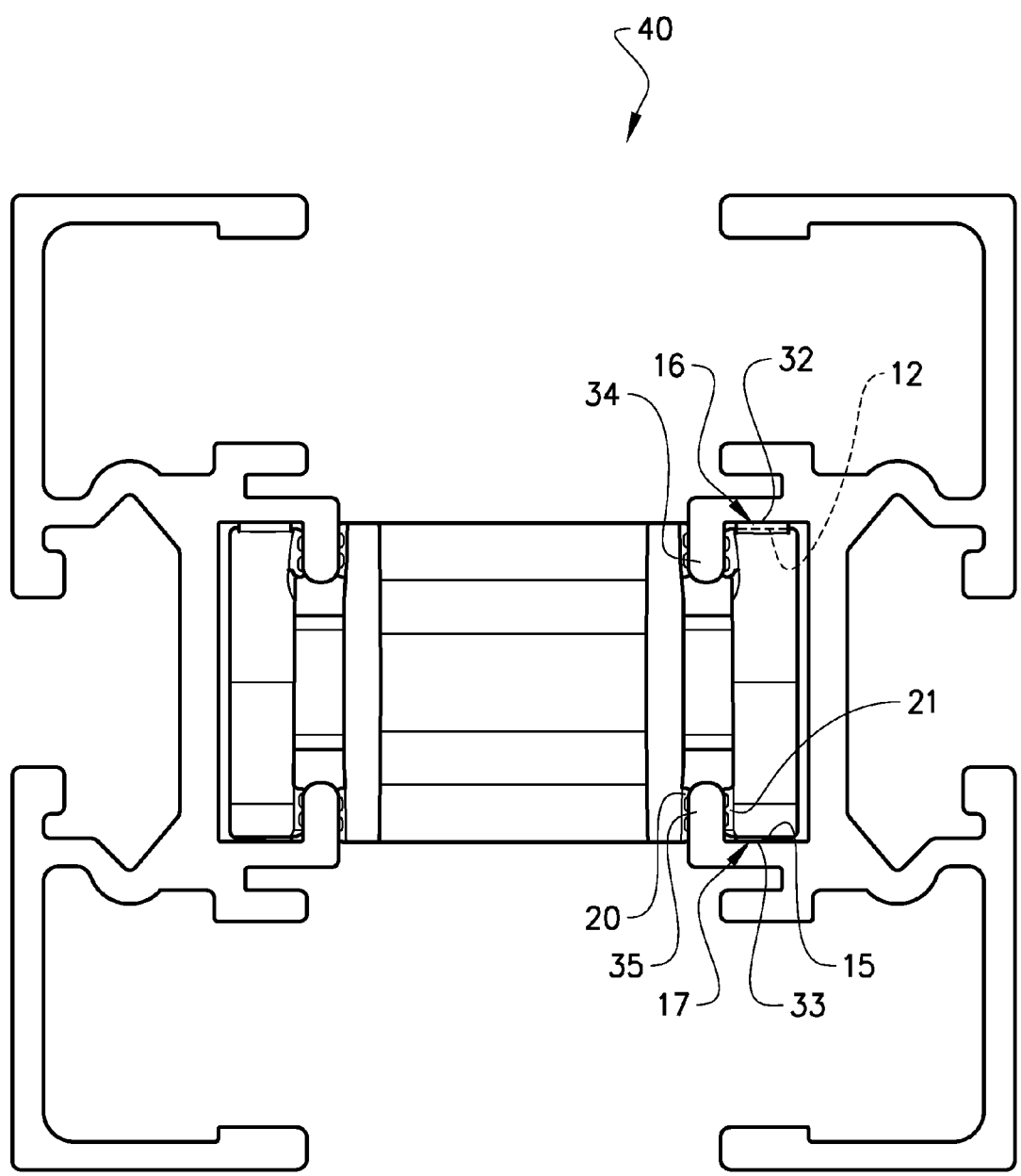
FIG. 4 shows a conveyor beam comprising a connector element in the arresting position, interconnecting two conveyor beam elements.

FIG. 3 shows a conveyor beam 40 in which the connector element is in the inserting position at two conveyor beam elements, and FIG. 4 shows an assembled conveyor beam in which the connector element is in the arresting position, interconnecting two conveyor beam elements into a conveyor beam. In the figures, a conveyor beam 40 comprising two longitudinal beam elements 30 is shown from an end view. The beam elements are provided with upper and lower flanges adapted for slide rails. Each conveyor beam is further provided with a beam channel 31, into which an outer portion of the connector element is inserted. In FIG. 3, the connector element is in the inserting position, with the first straight surface parts 10, 13 of the connector element directed towards the bearing surfaces 32, 33 of the conveyor beam channel 31. Since the dimensions of the outer portions are smaller than the beam channel in the inserting position, the connector element can easily slide in the beam channels to the desired mounting position.

FIG. 4 shows a conveyor beam 40 in which the connector element is in the arresting position, interconnecting the two conveyor beam elements. Here, the second straight surface parts 12, 15 of the connector elements are directed towards the bearing surfaces 32, 33 of the conveyor beam channel 31. Since the dimensions of the second straight surface parts are adapted to the dimensions of the conveyor channel, the second straight surface parts 12, 15 will bear against the bearing surfaces 32, 33 of the beam channel. The protrusions 16, 17 will also bear against the bearing surfaces 32, 33 of the beam channel, further securing the connector element to the beam elements. Further, the wedge-shaped protrusions 20, 21 of the grooves 5, 6 will bear against the flanges 34, 35, further securing the connector element to the conveyor beam element and providing a metal to metal connection between the connector element and the beam element.

By using a plurality of connector elements to assemble a conveyor beam from two conveyor beam elements, such as split beam elements, conveyor beams of different shapes can be provided, having different curvature in either the vertical or the horizontal direction. Other types of conveyor beams, such as X-bends or wheel bends can also be assembled in an easy and reliable way. It is also possible to assemble other types of conveyor beams using a connector element. FIG. 5 shows an example of a connector element provided with an attachment section 26. The attachment section extends from the central portion 2 of the connector element and will extend downwards when assembled in a conveyor beam.

The attachment section 26 is provided with a lower bearing surface 28, to which a third conveyor beam element can be attached. The attachment section 26 is in this example also provided with a through-hole 27 which is arranged through the attachment section. This allows a further conveyor beam element to be attached to the connector element from above, using a screw and a slot nut. It is also possible to provide the attachment section with a threaded hole such that a conveyor beam element can be attached from below, using a screw or other fastening means. Other attachment means, such as clips or locking channels may also be provided at the lower part of the attachment section.

Figure 6:
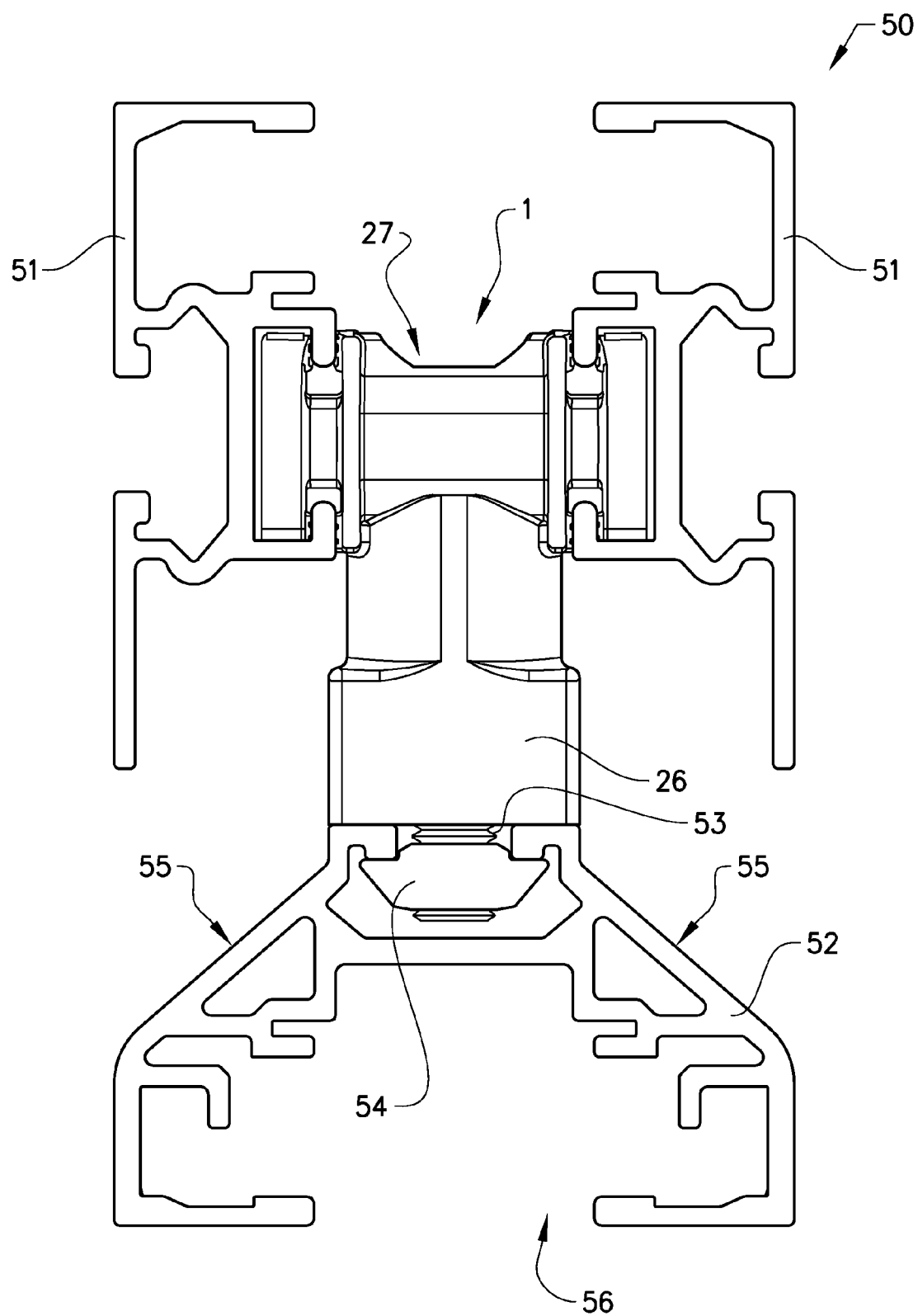
FIG. 6 shows a conveyor beam comprising a third conveyor beam element according to the invention.

FIG. 6 shows another example of a conveyor beam 50, where a connector element 1 with an attachment section 26 is used to interconnect the conveyor beam elements 51. This conveyor beam comprises a third, lower conveyor beam element 52 attached to the attachment section of the connector element. The third conveyor beam element bears on the lower bearing surface 28 of the attachment section, and is attached by using a screw 53 extending through a through-hole 27 of the connector element. The screw interacts with a slot nut 54 that is inserted in a channel in the third conveyor beam element.

This conveyor beam is especially suitable for more polluted environments or for product flows which emit a certain amount of dust particles. A conventional straight conveyor beam is extruded from aluminium. In such a conveyor beam, the conveyor chain return path is relatively well protected since the middle of the conveyor beam comprises an intermediate wall connecting the two sides. A curved conveyor beam does not comprise such a wall and is thus more open, which makes it possible for dust etc to enter into the conveyor chain when it is conveyed upside down in the return path. This will in turn increase wear of the chain. By using a separate lower conveyor beam element for the return path, it is possible to obtain a concealed return path also in the curved sections of a conveyor system.

The third, lower conveyor beam element is designed such that dust and liquids will not settle on the outer surfaces. The upper surfaces 55 of the lower conveyor beam element are thus inclined. Such an open conveyor beam will also simplify the cleaning of the conveyor beam, which is important for some kinds of industries.

The size of the connector element is adapted to the size of the conveyor beam elements and to the conveyor beam. The width of the central portion can be chosen such that conveyor beams of any required width can be obtained.

The invention is not to be regarded as being limited to the embodiments described above, a number of additional variants and modifications being possible within the scope of the subsequent patent claims. The conveyor beam may have any size and may be made from any suitable material.

REFERENCE SIGNS

1: Connector element
2: Central portion
3: First outer portion
4: Second outer portion
5: First groove
6: Second groove
7: Centre axis
8: Outer surface
9: Outer surface
10: First straight surface part
11: Semi-circular surface part
12: Second straight surface part
13: First straight surface part
14: Semi-circular surface part
15: Second straight surface part
16: Protrusion
17: Protrusion
18: Inner side
19: Inner side
20: Wedge shaped protrusion
21: Wedge shaped protrusion
22: Second protrusion
23: Key grip
24: Flange
25: Flange
26: Attachment section
27: Through-hole
28: Lower surface
30: Beam element
31: Beam channel
32: Upper bearing surface
33: Lower bearing surface
34: Upper flange
35: Lower flange
40: Conveyor beam
50: Conveyor beam
51: Beam element
52: Lower beam element
53: Screw
54: Nut
55: Inclined upper surface
56: Conveyor chain return path

The invention claimed is:

1. A conveyor beam for a conveyor system, comprising a plurality of unitary, metallic connector elements and at least two conveyor beam elements,
where a connector element comprises a central portion, two outer portions and two peripheral grooves extending peripherally around the connector element between the central portion and the outer portions,
where the connector element is provided with a first inserting position in which the connector element is inserted between two conveyor beam elements with the first outer portion positioned in a beam channel of a first conveyor beam element and the second outer portion positioned in a beam channel of a second conveyor beam element, and a second arresting position, in which the connector element locks the conveyor beam elements together to form the conveyor beam,
where the second arresting position is reached by rotating the connector element from the first inserting position, where each beam channel is provided with two flanges, wherein each inner side of each groove of the connector element is provided with a wedge shaped protrusion (20, 21), and that the wedge-shaped protrusions bear against the flanges when the connector element is in the second arresting position.

2. The conveyor beam according to claim 1, wherein the second arresting position of the connector element is positioned at a rotational angle of at least 45 degrees from the first inserting position.

3. The conveyor beam according to claim 1, wherein the second arresting position of the connector element is positioned at a rotational angle of substantially 90 degrees from the first inserting position.

4. The conveyor beam according to claim 1, wherein the outer portions of the connector element are provided with two outer surfaces that are parallel with a centre axis of the connector element, where each surface comprises a first straight surface part, a semicircular surface part and a second straight surface part.

5. The conveyor beam according to claim 4, wherein the distance a between the centre axis and the first surface parts is smaller than the distance between the centre axis and the second surface parts.

6. The conveyor beam according to claim 4, wherein the second surface parts are provided with a pointed protrusion having an acute angle.

7. The conveyor beam according to claim 1, wherein the wedge shaped protrusions are adjacent the second surface parts.

8. The conveyor beam according to claim 1, wherein the wedge shaped protrusions are provided with at least one second protrusion.

9. The conveyor beam according to claim 1, wherein the central portion of the connector element is provided with a key grip having an even number of straight surfaces adapted for a key wrench.

10. The conveyor beam according to claim 1, wherein the central portion of the connector element is provided with an attachment section extending downwards to which a third conveyor beam element is attached.

11. The conveyor beam according to claim 10, wherein the attachment section is provided with a through hole extending concentrically with the centre of the attachment section, and that the third conveyor beam element is attached to the connector element with a screw through the through-hole.

12. The conveyor beam according to claim 10, wherein the third conveyor beam element is provided with inclined upper surfaces and a concealed conveyor chain return path.

13. A conveyor system, comprising at least one conveyor beam according to claim 1.

* * * * *